UNITED STATES PATENT OFFICE.

ATHERTON SEIDELL, OF WASHINGTON, DISTRICT OF COLUMBIA.

SOLID COMBINATION OF VITAMINS AND PROCESS OF MAKING SAME.

1,173,317.  Specification of Letters Patent.  Patented Feb. 29, 1916.

No Drawing.  Application filed January 13, 1916. Serial No. 71,885.

(DEDICATED TO THE PUBLIC.)

*To all whom it may concern:*

Be it known that I, ATHERTON SEIDELL, a citizen of the United States, residing at Washington, District of Columbia, have invented certain new and useful Improvements in Solid Combinations of Vitamins and Processes of Making Same, of which the following is a specification.

This application is made under the act of March 3, 1883; chapter 143 (22 Stat., 635), and the invention herein described and claimed may be used by the Government of the United States or any of its officers or employees in the prosecution of work for the United States or by any person in the United States without the payment of any royalty thereon.

My invention is an improved process for easily obtaining vitamins in a solid stable form suitable for use in the prevention and cure of nutritional deficiency diseases.

It has been shown in recent years that in addition to the previously recognized necessary components of foods, such as proteins, carbohydrates, fats, etc., there must also be present in a healthful diet a certain amount of a substance (or substances) to which the general term "vitamin" has been given. Although it is believed that a mixed diet will ordinarily contain an adequate supply of vitamin, it has been demonstrated that under certain conditions an insufficient amount may be available in the food supply of certain individuals, and diseases characterized by nutritional disturbances result. In connection with the development of this conception, many efforts have been made to isolate vitamins for the purpose of a more minute study both as to their chemical nature and physiological activity. All procedures so far developed have been very wasteful and none have yielded a product available in sufficient amounts for general use in medicine.

I have found that by adding fullers' earth to a liquid such as the filtrate from autolyzed yeast known to contain a relatively large amount of vitamin that a selective adsorption of the vitamin occurs and that after the thoroughly shaken mixture of fullers' earth and the liquid has been filtered, the filtrate is practically free from vitamin, whereas the solid contains practically all that was originally present in the liquid. This process is, therefore, very efficient in that the vitamin is separated quite perfectly from the relatively large proportion of the many other substances with which it occurs. The solid product is obtainable in large amounts and can be readily dried and the vitamin contained in it retains its physiological activity for at least several months.

The procedure for preparing the new combination of vitamin and a solid inorganic adsorptive agent such as fullers' earth may, for instance, be carried out as follows: Washed and pressed brewers' yeast is caused to autolyze, *i. e.*, digest itself, by keeping it at a temperature of 37.5° C. for about 36 hours. The resulting thick liquid is filtered and to the clear filtrate is added 50 grams of very finely divided fullers' earth for each liter of liquid. The mixture is shaken and standard hydrochloric acid of normal strength is added in the proportion of 10 c. c. per liter, for the purpose of increasing the rate of subsidence of the solid. After standing until the solid has completely settled to the bottom, the supernatant liquid is siphoned off. The solid is then washed by decantation with dilute acid of approximately 0.01 normal strength and finally washed on a suction filter with several small portions of strong ethyl alcohol. It is then dried in a vacuum desiccator containing concentrated sulfuric acid. I have found by experiments on pigeons rendered neuritic by an exclusive diet of polished rice, that if less than 50 grams of fullers' earth was used per liter of the autolyzed yeast filtrate, that the vitamin was not removed completely. It is, therefore, necessary to select an adsorptive agent of high efficiency and to use an adequate amount of it to remove the vitamin completely.

Calculating on the basis of experiments made with the nutritional deficiency disease, polyneuritis gallinarum (in pigeons), an adequate dose of the activated solid, for a man, would be 5 grams. This is an amount which can be easily taken in aqueous suspension or in capsules and taken daily will furnish sufficient vitamins to replace a deficiency which would otherwise eventually result in noticeable symptoms.

Although I have referred above to yeast filtrates as the source of the vitamin I do not confine myself to this source alone since the process is equally applicable to juices obtained from various substances of vegetable and animal origin, such as fruit juices, meat extracts, etc., and may be applied to these products directly or after hydrolysis with acids or other processes for rendering the vitamin more readily adsorbed by the fullers' earth. I also do not confine myself to the exclusive use of fullers' earth, since any other physiologically inert inorganic adsorptive agent can be used, providing its adsorptive capacity is sufficient to permit its use in amounts small enough to yield a product of sufficient concentration for administration to man and animals.

What I claim and desire to secure by Letters Patent of the United States is:

1. A process for separating vitamin from complex mixtures by the use of an inorganic physiologically inert adsorptive agent.

2. A solid product consisting of a combination of vitamin and an inorganic physiologically inert solid.

In testimony whereof I affix my signature in presence of two witnesses.

ATHERTON SEIDELL.

Witnesses:
G. W. McCoy,
A. M. Stimson.